(12) United States Patent
Peshkovsky et al.

(10) Patent No.: US 8,651,230 B2
(45) Date of Patent: Feb. 18, 2014

(54) HIGH CAPACITY ULTRASONIC REACTOR SYSTEM

(75) Inventors: Sergei L. Peshkovsky, New York, NY (US); Alexey S. Peshkovsky, New York, NY (US)

(73) Assignee: Industrial Sonomechanics, LLC, New York, NY (US)

( * ) Notice: Subject to any disclaimer, the term of this patent is extended or adjusted under 35 U.S.C. 154(b) by 1068 days.

(21) Appl. No.: 12/667,480

(22) PCT Filed: Jun. 30, 2008

(86) PCT No.: PCT/US2008/068697
§ 371 (c)(1),
(2), (4) Date: Dec. 31, 2009

(87) PCT Pub. No.: WO2009/006360
PCT Pub. Date: Jan. 8, 2009

(65) Prior Publication Data
US 2010/0296975 A1    Nov. 25, 2010

Related U.S. Application Data

(60) Provisional application No. 60/947,768, filed on Jul. 3, 2007.

(51) Int. Cl.
*A61B 17/20* (2006.01)
*H03H 9/00* (2006.01)
*G08B 3/02* (2006.01)

(52) U.S. Cl.
USPC .......... 181/142; 604/22; 333/145; 181/139; 310/323.19

(58) Field of Classification Search
USPC ............... 422/22, 127–128; 606/128; 604/22, 604/128; 333/145; 181/139, 142; 310/323.21, 323.19
See application file for complete search history.

(56) References Cited

U.S. PATENT DOCUMENTS

| | | |
|---|---|---|
| 5,468,429 A | 11/1995 | Li et al. |
| 7,156,201 B2 * | 1/2007 | Peshkovskiy et al. ........ 181/175 |
| 7,157,058 B2 | 1/2007 | Marhasin et al. |
| 7,160,516 B2 | 1/2007 | Simon et al. |
| 2007/0053789 A1 * | 3/2007 | Ricciardi et al. ................ 422/28 |

* cited by examiner

*Primary Examiner* — Monzer R Chorbaji
(74) *Attorney, Agent, or Firm* — David L. Nocilly; Bond Schoeneck & King, PLLC

(57) ABSTRACT

An ultrasonic reactor system with an appropriately designed reactor chamber used in conjunction with a compatible ultrasonic Barbell Horn or its derivative that provides a significant efficiency increase and an intensification of sonochemical and sonomechanical processes is disclosed. These enhancements arise from the ability of the reactor chamber to direct all treated liquid media through the highly active ultrasonic cavitation region located near the surface of the horn, as well as from several improvements in the Barbell Horn design that significantly increase its longevity and in its output surface area, thereby increasing the total size of the active cavitation region.

16 Claims, 11 Drawing Sheets

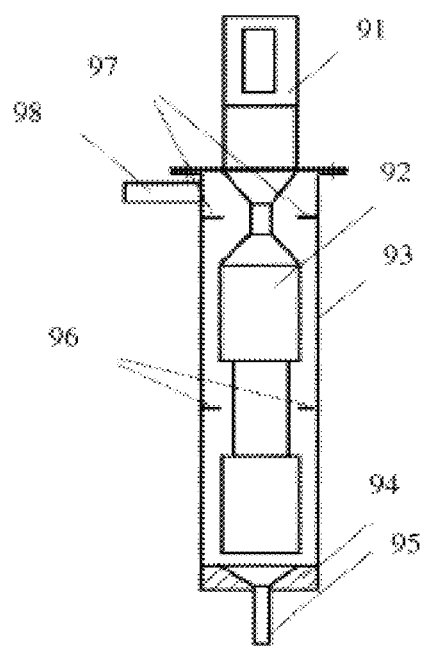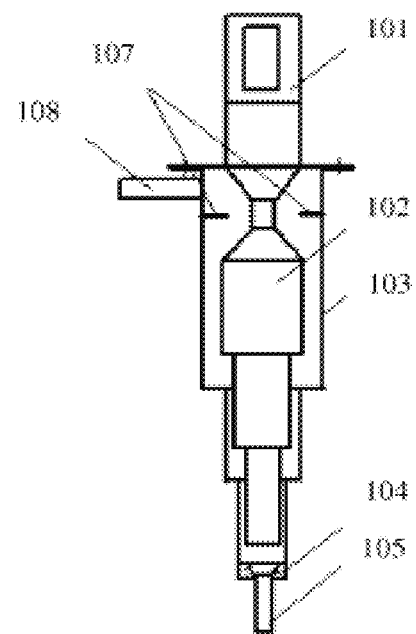
Figure 13                    Figure 14

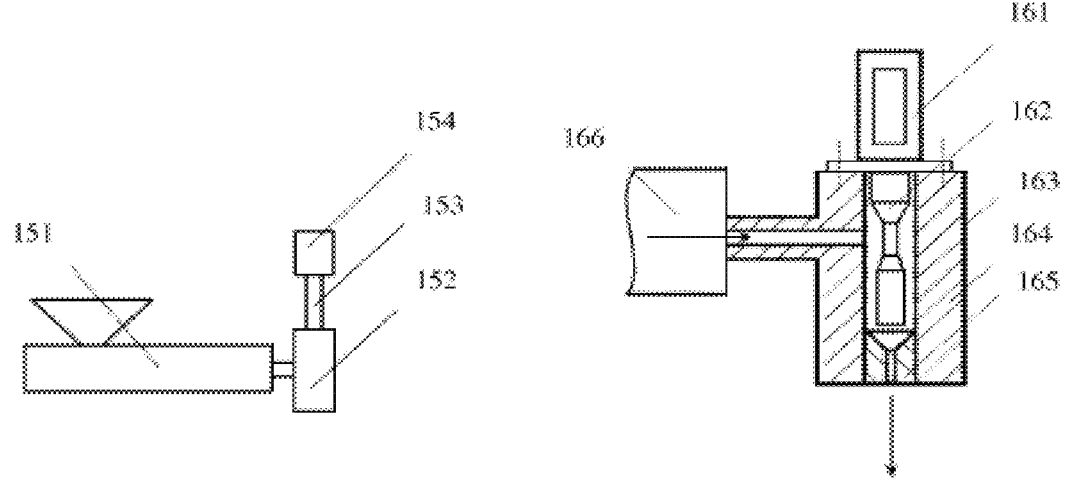
Figure 19
Figure 20
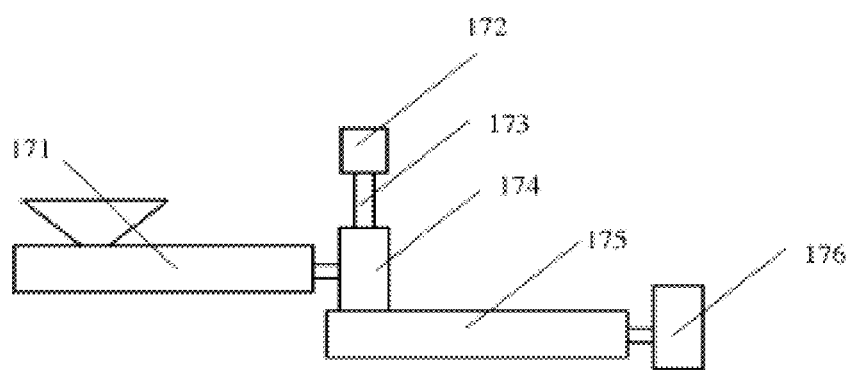
Figure 21

HIGH CAPACITY ULTRASONIC REACTOR SYSTEM

CROSS-REFERENCE TO RELATED APPLICATION

The present application claims priority to PCT Number PCT/US2008/068697 which claims priority to U.S. Provisional Application No. 60/947,768, filed Jul. 3, 2007.

BACKGROUND OF THE INVENTION

1. Field of the Invention

The present invention relates to the field of ultrasonic equipment and, more specifically, systems for the transmission of acoustic energy into liquid media during acoustic cavitation-based sonochemical and sonomechanical processes.

2. Description of the Related Art

Advantages of using ultrasonically induced acoustic cavitation to carry out technological processes in liquids are well documented, for example, in the following references: K. S. Suslick, Sonochemistry, Science 247, pp. 1439-1445 (1990); T. J. Mason, Practical Sonochemistry, A User's Guide to Applications in Chemistry and Chemical Engineering, Ellis Norwood Publishers, West Sussex, England (1991), hereby incorporated by reference.

In the prior art ultrasonic systems designed for industrial sonochemical and sonomechanical processes, the liquid commonly is subjected to ultrasonic treatment as it flows through a reactor. The latter commonly consists of a reactor chamber incorporating an ultrasonic waveguide radiator (horn) connected to an electro-acoustical transducer. The horn is used to amplify the transducer's vibration amplitude, which is necessary because the vibration amplitude of the transducer itself is not sufficient for most industrial processes. Such ultrasonic reactor systems are described, for example, in U.S. Published Patent Application No. 2006/0196915, U.S. Published Patent Application No. 2005/0274600 and U.S. Pat. No. 7,157,058, hereby incorporated by reference.

All of the abovementioned systems possess an important common drawback, which restricts their ability to create powerful ultrasonic cavitation fields and limits their production capacity. This drawback stems from the fact that the acoustic horns used in the prior art generally have tapered shapes, such as conical, exponential, catenoidal, stepped, or more complex, converging in the direction of the load. While these horns may have high gain factors and permit significantly increasing vibration amplitudes, the increase occurs always at the expense of the output surface areas, which become small as a result. Therefore, while converging horns are capable of increasing the specific acoustic power (or vibration amplitude at a given ultrasonic frequency) radiated by a transducer into a load quite effectively, they do not permit achieving significant levels of total radiated acoustic power. The total power provided by a generator and a transducer is, therefore, not efficiently transmitted into the liquid (reflected back). Consequentially, sonochemical reactors based on these horns are effective only on the laboratory scale. Success of industrial applications of such systems is limited. Additionally, in the design of the abovementioned ultrasonic reactors, the size and shape of the cavitation field itself is not taken into account, which further lowers their efficiency.

In the work by G. Cervant, J.-L. Laborde, et al., "Spatio-Temporal Dynamics of Cavitation Bubble Clouds in a Low Frequency Reactor," Ultrasonic Sonochemistry 8 (2001), 163-174, hereby incorporated by reference, a theoretical study describing the shape, size and position of the cavitation field formed under an ultrasonic radiator is described in detail. In the article by A. Moussatov, R Mettin, C. Granger et all "Evolution of Acoustic Cavitation Structures Near Larger Emitting Surface", WCU 2003, Paris, Sep. 7-10, 2003, hereby incorporated by reference, a similar experimental study was conducted. The results show that during operation of an acoustic horn, a stable well developed cavitation filed only starts to form when the following two necessary conditions are fulfilled: (1) specific intensity of the ultrasonic energy radiated into liquid exceeds 8 W/cm$^2$ (for water) and (2) the output diameter of the radiator's cross section is on the order of the acoustic wavelength, $\lambda$, in the original supplied liquid load (before cavitation has started). In other words, the radiator should transmit a planar acoustic wave into the liquid. In this case, the cavitation field starts to become stable and takes the shape of an upside-down circular cone. It is important to also point out that such stable cavitation field at the described conditions has maximum possible geometrical size. Therefore, only if such stable cavitation field can be established in an ultrasonic reactor will the productivity be maximized and will the optimal stability and the operational quality be reached. The exact size of the cavitation field formed under an ultrasonic radiator was not, however, obtained in the abovementioned studies. Additionally, cavitation formed near the lateral surface of the radiator was not studied.

Deposition of at least 8 W/cm$^2$ (for water) of specific acoustic power requires the amplitudes of vibration velocity of the output surface of an acoustic horn to exceed 112 cm/sec (rms) (oscillatory amplitudes exceeding 25 microns peak-to-peak at 20 kHz). Since most materials used to make ultrasonic transducers cannot themselves provide such amplitudes, ultrasonic horns must be utilized, having gain factors of at least 3. Even higher horn gain factors are preferred because most sonochemical or sonomechanical processes require amplitudes that are much greater than this threshold value. Since the speed of sound in most liquids of interest, such as water, oils, alcohols, etc, is on the order of 1500 msec, $\lambda$ in those liquids at the common working ultrasonic frequencies of 18-22 kHz is about 65-75 mm. As mentioned above, it is necessary that the diameter of the output surface of the horn be close to $\lambda$ in the liquid load. Consequentially, only the horns that provide high output oscillatory amplitudes (high gain factors) and have large output surface areas simultaneously are truly appropriate for the use in efficient high-capacity industrial ultrasonic reactor systems for sonomechanical and sonochemical processes. None of the common converging horns are, therefore, appropriate.

A prior art "Barbell Horn" design, U.S. Pat. No. 7,156,201, hereby incorporated by reference, circumvents the abovementioned limitation of converging horns to a large degree, being able to provide high output oscillatory amplitudes (high gain factors) and large output surface areas simultaneously. In the same prior art, a modified version of the Barbell Horn is also introduced, which may be called "Long Barbell Horn." This horn has a very large lateral radiation surface and is also convenient for the use in the efficient high-capacity industrial ultrasonic reactor systems.

The prior art "Barbell Horn", its derivatives as well as the related ultrasonic reactor designs, however, are subject to some important limitations. U.S. Pat. No. 7,156,201 provides a system of equations that is suitable only for the calculation of the Barbell Horns with cone-shaped transitional sections (parts of the horns that have changing cross-sections). Additionally, a restriction exists in the description and in the claims of the same prior art, requiring that the length of any transitional section be equal or greater than $\text{Log}(N)/k$, where $k=\omega/C$ is the wave number for the transitional section, $N$ is the ratio of the diameters of the thick and the thin cylindrical sections that are adjacent to the transitional section, $\omega$ is the angular vibration frequency, $C$ is the sound velocity in the horn material at the transitional section (with phase velocity dispersion taken into account). This restriction came from the fact that the specified length of the transitional section is critical from the standpoint of the passage of a longitudinal acoustic wave. Such selection of the length of the transitional section was thought to be necessary to decrease the degree of dynamical strain and stress along the section length and thus to increase the operational life of the waveguide-radiator. The design principles and the calculation method for the horns which are free from this restriction were not available and are not provided in the prior art.

Additionally, the only ultrasonic reactor designs mentioned in the prior art are those based on the Barbell Horns equipped with additional resonance elements, such as vibrating disks, spheres, helical surfaces, etc. All these additional elements significantly complicate the construction of the Barbell Horns, introduce additional mechanical connections and, therefore, reduce life span and reliability. It is also clear that utilizing the Barbell Horns or any of their modified versions in a non-restricted or an incorrectly restricted volume (reactor chamber) leads to an inefficient process, since not all liquid is put through the well developed cavitation field zone and/or the optimal treatment time in the cavitation field is not reached.

Therefore, to be able to maximize the effect of the ultrasonic cavitation treatment on a liquid load (pure liquid, liquid mixture, liquid emulsion, suspension of solid particles in a liquid, polymer melts, etc.), a well defined need exists to develop: 1) improved Barbell Horn designs, free from the abovementioned limitations and 2) improved ultrasonic reactor designs in which a Barbell Horn (of a novel design introduced in this invention or of a design described in the prior art) is correctly placed inside a flow-through (or stationary) volume (also called reactor chamber, flow cell, etc.).

BRIEF SUMMARY OF THE INVENTION

It is therefore a principal object and advantage of the present invention to provide a high-capacity ultrasonic reactor system that increases the total amount of acoustic energy radiated into a liquid medium by the ultrasonic reactor system.

It is an additional object and advantage of the present invention to provide a high-capacity ultrasonic reactor system that increases the available radiation surface and the uniformity of the distribution of acoustic energy throughout the volume of an ultrasonic reactor system.

It is a further object and advantage of the present invention to provide a high-capacity ultrasonic reactor system that increases the intensity of acoustic energy radiated into the liquid medium of an ultrasonic reactor system.

It is another object and advantage of the present invention to provide a high-capacity ultrasonic reactor system that maximizes the transfer efficiency of the ultrasonic generator's electric energy into the acoustic energy radiated into the liquid medium.

It is an additional object and advantage of the present invention to provide a high-capacity ultrasonic reactor system that improves the quality of operation and to increase the operational lifespan of the ultrasonic horn incorporated in the ultrasonic reactor system.

It is a further object and advantage of the present invention to provide a high-capacity ultrasonic reactor system that maximizes the production capacity of the ultrasonic reactor system.

In accordance with the foregoing objects and advantages, the present invention provides several novel designs of Barbell Horns and further provides several novel ultrasonic reactor systems with appropriately designed reaction chambers used in conjunction with compatible ultrasonic Barbell Horns. The use of these novel ultrasonic reactor system designs significantly increases the efficiency of the systems and greatly intensifies the sonochemical and sonomechanical processes. These enhancements occur primarily due to the resulting ability to direct all treated liquid media through the highly active cavitation region located near the surface of the Barbell Horns, as well as due to the improvements in the horn designs providing significant increase in their output surface areas and, therefore, increasing the size of the active cavitation regions, while increasing their longevity by drastically improving the associated strain and stress distributions.

In the first embodiment of the present invention a novel Barbell Horn design is introduced, in which the first transitional section is short (shorter than the value $\text{Log}(N)/k$) and has a catenoidal shape (referred to herein as the Catenoidal Barbell Horn).

In the second embodiment of the present invention a novel Transducer-Barbell Horn Assembly design is introduced, in which the first transitional section is short and has a catenoidal shape (referred to herein as the Catenoidal Transducer-Barbell Horn Assembly).

In the third embodiment of the present invention a novel Long Barbell Horn design is introduced, in which the first (and, optionally, the second) transitional section is short and has a catenoidal shape. Additionally, piezoelectric annular transducers may be incorporated close to the nodal locations of this horn (referred to herein as the Catenoidal Long Transducer-Barbell Horn Assembly).

In the fourth embodiment of the present invention a novel Barbell Horn design is introduced, in which the output cylindrical section has a series of specially positioned grooves and protrusions (referred to herein as the Patterned Barbell Horn). The first transitional section of this horn may have any of the shapes described in U.S. Pat. No. 7,156,201 or a short catenoidal shape as described in the present invention. Additionally, piezoelectric annular transducers may be incorporated close to the nodal locations of this horn (referred to herein as the Patterned Transducer-Barbell Horn Assembly).

In the fifth embodiment of the present invention a novel Barbell Horn design is introduced, in which additional radiating cylindrical sections of different diameters are incorporated (referred to herein as the Extended Barbell Horn). The first transitional section of this horn may have any of the shapes described in U.S. Pat. No. 7,156,201 or a short catenoidal shape as described in the present invention. Additionally, piezoelectric annular transducers may be incorporated close to the nodal locations of this horn (referred to herein as the Extended Transducer-Barbell Horn Assembly).

In the sixth embodiment of the present invention a novel Barbell Horn design is introduced, in which a hollow region in one or two last sections (the last output section and the section adjacent to it) exists, called the short or the long hollow region, respectively. The first transitional section of this horn may have any of the shapes described in U.S. Pat. No. 7,156,201 or a short catenoidal shape as described in the present invention. Additionally, piezoelectric annular transducers may be incorporated close to the nodal locations of this horn (referred to herein as the Hollow Transducer-Barbell Horn Assembly).

In all of the subsequent embodiments of the present invention, the novel ultrasonic reactor designs are based on Barbell Devices (Barbell Horns or Transducer-Barbell Horn Assemblies). In some of the embodiments, the novel ultrasonic reactor designs are based on the prior art Barbell Devices, which are the Barbell Horn, the Long Barbell Horn or the corresponding Transducer-Barbell Horn Assemblies with long first transitional sections. In other embodiments, the novel designs of the Barbell Devices (Catenoidal Barbell Horn, Catenoidal Long Barbell Horn, Patterned Barbell Horn, Extended Barbell Horn, Hollow Barbell Horn or the corresponding Transducer-Barbell Horn Assemblies) are used as a basis of the novel complementary ultrasonic reactor designs.

In all of the subsequent embodiments of the present invention, the utilized Barbell Device has an output diameter that is close to the acoustic wavelength, $\lambda$, in a given liquid before cavitation at a given ultrasonic frequency.

In all of the subsequent embodiments of the present invention, the specific radiated acoustic power is not less than 10 W/cm$^2$.

In all of the subsequent embodiments of the present invention, a Barbell Device is incorporated into a reaction chamber In the seventh embodiment of the present invention the distance between the radiating surface of the horn and the bottom of the reactor chamber is close to the acoustic wavelength, $\lambda$, in a given liquid at a given ultrasonic frequency, the volume of liquid in the active cavitation field is close to $\lambda^3/4$, and the reactor chamber is attached to the Barbell Device, such as the Barbell Horn, Catenoidal Barbell Horn, Patterned Barbell Horn or the any of the corresponding Transducer Barbell Horn Assemblies, with a hermetically tight connection at a node of its acoustic vibrations.

In the eighth embodiment of the present invention, a circular reflection surface is attached to an internal wall of the flow-through reactor chamber, which directs the entire flow of the liquid through the additional cavitation field formed near the lateral surface of the Barbell Device at its narrow part.

In the ninth embodiment of the present invention, the Barbell Device is inserted into a reaction chamber, which at the bottom has an upside-down circular cone insert with an opening at the top containing a liquid inlet/outlet valve. The height of this cone and the diameter of its base are close to $\lambda$, its volume—to $\lambda^3/4$. The abovementioned circular reflection surface may also be used in conjunction with this embodiment.

In the tenth embodiment of the present invention, the ultrasonic flow-through reactor incorporates a Long Barbell Horn, a Catenoidal Long Barbell Horn or a corresponding Long Transducer Barbell Horn Assembly. The abovementioned circular reflection surface(s) and the upside-down circular cone insert may also be used in conjunction with this embodiment.

In the eleventh embodiment of the present invention, the ultrasonic flow-through reactor incorporates an Extended Barbell Horn (or Extended Transducer Barbell Horn Assembly). The abovementioned circular reflection surface(s) and the upside-down circular cone insert may also be used in conjunction with this embodiment.

In the twelfth embodiment of the present invention, the ultrasonic flow-through reactor incorporates a different version of the Extended Barbell Horn (or Extended Transducer Barbell Horn Assembly). The abovementioned circular reflection surface(s) and the upside-down circular cone insert may also be used in conjunction with this embodiment.

In the thirteenth embodiment of the present invention, the ultrasonic flow-through reactor incorporates a Hollow Barbell Horn (or Hollow Transducer Barbell Horn Assembly), with a short hollow region (in its output section only). The liquid is supplied near the top of the hollow region into the cavitation field formed inside the hollow region.

In the fourteenth embodiment of the present invention, the ultrasonic flow-through reactor incorporates a Hollow Barbell Horn (or Hollow Transducer Barbell Horn Assembly), which incorporates a long hollow region (in the last output section and the section adjacent to it). The liquid is supplied near the top of the hollow region into the cavitation field formed inside the hollow region.

In the fifteenth embodiment of the present invention, the ultrasonic flow-through reactor incorporates a Hollow Barbell Horn (or Hollow Transducer Barbell Horn Assembly), which incorporates a long hollow region. The reactor chamber is modified such that all liquid is directed into the highest intensity cavitation zone. An upside-down position of this reactor is preferably utilized. The liquid is supplied near the top of the hollow region into the cavitation field formed inside the hollow region.

In the sixteenth embodiment of the present invention, the ultrasonic flow-through reactor incorporates a Hollow Barbell Horn (or Hollow Transducer Barbell Horn Assembly) with a short or long hollow region and a generic horn of an arbitrary design. The horns are arranged such that the generic horn fits inside the Hollow Barbell Horn (or Hollow Transducer Barbell Horn Assembly). The horns are operated in-phase, thereby increasing the cavitation field intensity.

In the seventeenth embodiment of the present invention, the ultrasonic flow-through reactor is designed to be suitable for processing high-viscosity viscoelastic liquids, such as polymer melts. Polymer melt is supplied from the polymer extruder into the heated reactor at the narrow region of the Barbell Device, such that the upper cylindrical element of the Barbell Device, which is inserted into the reactor body on a sliding sealed connection with minimal gap. The shaping device of the reactor has an entrance region in the shape of an upside-down circular cone. Cascade extrusion arrangements are also possible to use in conjunction with this embodiment.

In the eighteenth embodiment of the present invention, the ultrasonic flow-through reactor is designed to be suitable for the processing of chemically aggressive liquids, extremely high-purity compounds, as well as for operation in electromagnetic, magnetic, electric, microwave, etc, fields in which the use of metallic objects is undesirable or impossible. Ultrasonic radiation in such a reactor is performed using a Barbell Device (possibly with an additional acoustically rigidly connected waveguide-radiator) made from a nonmetallic material, such as technical corundium material, $Al_2O_3$, (for example, sapphire, leucosapphire, ruby, etc.)

BRIEF DESCRIPTION OF THE DRAWINGS

The present invention will be more fully understood and appreciated by reading the following Detailed Description in conjunction with the accompanying drawings, in which:

FIG. 13 is a flow-through ultrasonic reactor based on an Extended Barbell Horn (or Extended Transducer Barbell Horn Assembly), according to another embodiment of the present invention.

FIG. 14 is a flow-through ultrasonic reactor based on another version of an Extended Barbell Horn (or Extended Transducer Barbell Horn Assembly), according to another embodiment of the present invention.

FIG. 19 is a schematic of a device for treatment of high-viscosity polymer melts with high-intensity ultrasound according to another embodiment of the present invention.

FIG. 20 is an expanded view of a flow-through ultrasonic reactor for treatment of high-viscosity polymer melts with high-intensity ultrasound according to another embodiment of the present invention.

FIG. 21 is a schematic of a device for the treatment of high-viscosity polymer melts with high-intensity ultrasound based on the principle of cascade extrusion according to another embodiment of the present invention.

DETAILED DESCRIPTION OF THE INVENTION

Embodiment 1—Catenoidal Barbell Horn

U.S. Pat. No. 7,156,201 provides a system of equations that is suitable only for calculating the Barbell Horns (or Transducer Barbell Horn Assemblies) with cone-shaped transitional sections (parts of the horns that have changing cross-sections). Additionally, a restriction exists in the description and in the claims of the same prior art, requiring that the length of any transitional section be equal or greater than $Log(N)/k$, where $k=\omega/C$ is the wave number, N is the ratio of the diameters of the thick and the thin cylindrical sections that are adjacent to the transitional section, $\omega$ is the angular vibration frequency, C is the sound velocity in the horn material at the transitional section (with phase velocity dispersion taken into account). This restriction came from the fact that the specified length of the transitional section is critical from the standpoint of the passage of a longitudinal acoustic wave. Such selection of the length of the transitional section was thought to be necessary to decrease the degree of dynamical strain and stress along the section length and thus to increase the operational life of the waveguide-radiator. The design principles and the calculation method for the horns which are free from this restriction were not available and are not provided in the prior art.

In the present invention it has been determined that when the cross-section of the transitional section changes according to a more complex pattern, such as the catenoidal law, the degree of dynamical strain and stress along the section length does not reach dangerous levels even when the section is shorter than the abovementioned restriction. This stems from the fact that when the transitional section's cross-sectional diameter changes according to the catenoidal law, a very smooth transition into the surface of the adjacent cylindrical section is always achieved. The transitional section length values corresponding to the condition $L<Log(N)/k$, where the operator Log is a natural logarithm, are critical with respect to the value of k, which becomes imaginary for the exponential transitional section shapes. For the catenoidal transitional section shapes, the value k becomes imaginary at lower values of L, specifically $L<Arch(N)/k$, where the operator ch is a hyperbolic cosign. Since in this case the value of $k=i|k|$ is imaginary, the equations provided in U.S. Pat. No. 7,156,201 can be also used for the calculations of the Barbell Horns with catenoidal transitional sections if the trigonometric functions are replaced by the hyperbolic functions. Using such calculations it is possible to construct a Catenoidal Barbell Horn that has a significantly shorter transitional section than $Log(N)/k$ without high dynamical stains and/or stresses.

Figure 1:
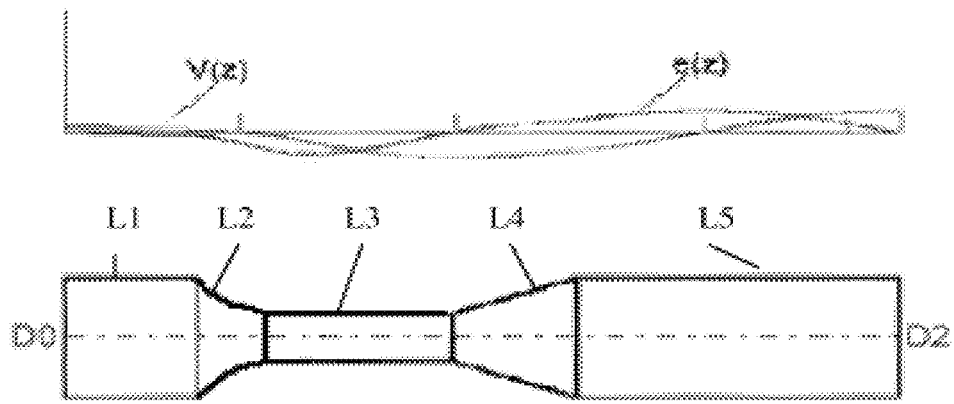
FIG. 1 is a Catenoidal Barbell Horn according to one embodiment of the present invention.

The following example provides clarification of the above-mentioned theoretical explanation. Catenoidal Barbell Horn was calculated for the operation frequency of 20 kHz, having catenoidal first transitional section of the length significantly smaller than the value $Log(N)/k$. FIG. 1 shows a Catenoidal Barbell Horn according to the first embodiment of the present invention, where V(z)—distribution of the amplitude of vibration velocity along the horn length, e(z)—distribution of the deformation along the horn length, with lengths L1-L5 representing the lengths of the corresponding horn elements, respectively. In a preferred embodiment, the Catenoidal Barbell Horn has the following lengths: L1=54.33 mm, L2=20.61 mm, L3=54.33 mm, L4=41.22 mm, L5=106.71 mm, Gain=5.16, D0=D2=50 mm, Freq=20 kHz, and is made from 2024 aluminum. It can be seen from the figure that although the transitional section L2 is significantly shorter than Log (N)/k, the deformation change along the horn is smooth and continuous, without any dangerous discontinuities associated with high degrees of strain and stress. The calculated horn was constructed and tested, showing excellent correlation of its properties with those predicted in the calculations.

Embodiment 2—Catenoidal Transducer-Barbell Horn Assembly

Barbell Horn incorporating an active acoustic transducer for converting electric energy into acoustic energy was described in U.S. Pat. No. 7,156,201. In this device, piezoelectric annular transducers are situated in the Barbell Horn close to the node locations, and, because the utilized Barbell Horn has a gain factor greater than unity, the amplitude of the vibrations at the output end of the assembly is much higher than the amplitude of the vibrations of the piezoelectric annular transducers themselves.

Figure 2:
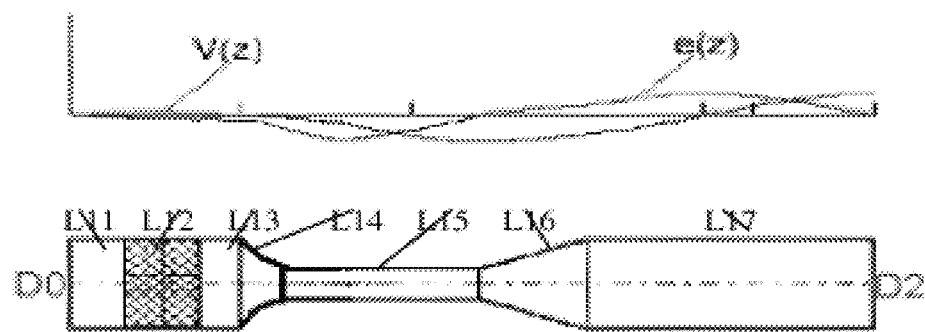
FIG. 2 is a Catenoidal Transducer Barbell Horn Assembly according to another embodiment of the present invention.

The first transitional section of this device, however, was limited to having a conical shape and the length equal or greater than the value Log(N)/k (Conical Transducer-Barbell Horn Assembly). In the present invention, a Catenoidal Transducer-Barbell Horn Assembly is introduced, having catenoidal first transitional section of the length significantly smaller than the value Log(N)/k. FIG. 2 shows this assembly along with the distributions of the amplitude of vibration velocity, V(z), and deformation, e(z), along the assembly's length, with L11-L17—indicating the lengths of the corresponding assembly elements, respectively. In a preferred embodiment, the Catenoidal Transducer-Barbell Horn Assembly has the following dimensions: L11=17.96 mm, L12=32.00 mm, L13=12.3 mm, L14=20.6 mm, L15=49.46 mm, L16=41.22 mm, L17=106.71 mm, G=6.07, D0=D2=50 mm, d=20 mm, F=20 kHz, and is made from 2024 aluminum and APC 841 ceramic (APC International Ltd., USA). The drawing shows that although the transitional section L4 is significantly shorter than Log(N)/k, the deformation change along the assembly is smooth and continuous, without any dangerous discontinuities associated with high degrees of strain and stress. The calculated assembly was constructed and tested, showing excellent correlation of its properties to those predicted in the calculations.

Embodiment 3—Catenoidal Long Barbell Horn (Catenoidal Long Transducer-Barbell Horn Assembly)

Figure 3:
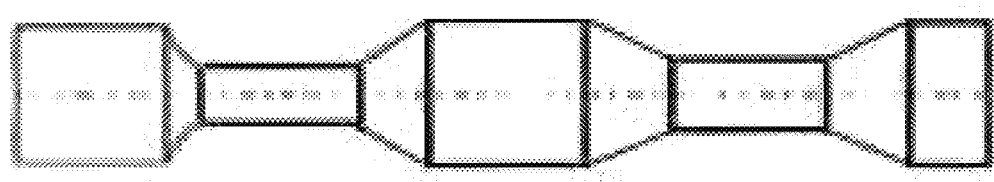
FIG. 3 is a Catenoidal Long Barbell Horn (or Catenoidal Long Transducer Barbell Horn Assembly) according to another embodiment of the present invention.

A modification of the Barbell Horn was described in U.S. Pat. No. 7,156,201, in which radiation occurs also from the side surface. The horn is made in the form of alternating cylindrical sections and sections of variable cross-section. The surfaces of the sections of variable cross-section have components of the amplitude of vibrations that are directed perpendicular to the horn's main axis. In addition, the lengths of the horn sections are calculated in such a way that the components of the vibration amplitude of the sections of variable cross-section that are directed along the waveguide axis are oriented toward each other. In this manner, a strong lateral radiation of the waveguide-radiator is achieved. Since there are no theoretical limitations on the total length of the horn, the total area of its side radiating surface can be arbitrarily large corresponding to an arbitrarily large amount of the total acoustic energy radiated into a liquid. The first transitional section of this device, however, was limited to having a conical shape and the length equal or greater than the value Log(N)/k. In the present invention, a Catenoidal Long Barbell Horn is introduced, having catenoidal first transitional section of the length significantly shorter than the value Log(N)/k, as shown in FIG. 3. Additionally, piezoelectric annular transducers may be incorporated close to the nodal locations of this horn converting it into a Catenoidal Long Transducer-Barbell Horn Assembly.

Embodiment 4—Patterned Barbell Horn (Patterned Transducer-Barbell Horn Assembly)

To increase the total radiating surface of a Barbell Horn and, therefore, to achieve an increase in the total radiated energy, additional radiating elements, such as resonant plates and spheres may be used, such as described in U.S. Pat. No. 7,156,201. The elements may be acoustically rigidly connected to the horn using welding, soldering or threaded connections. However, because the elements are not machined as integral parts of the horns, but are attached afterwards, the resulting horns have "weak spots" at the connections and could break at high vibration amplitudes during which they undergo significant sign-changing deformations.

Figure 4:
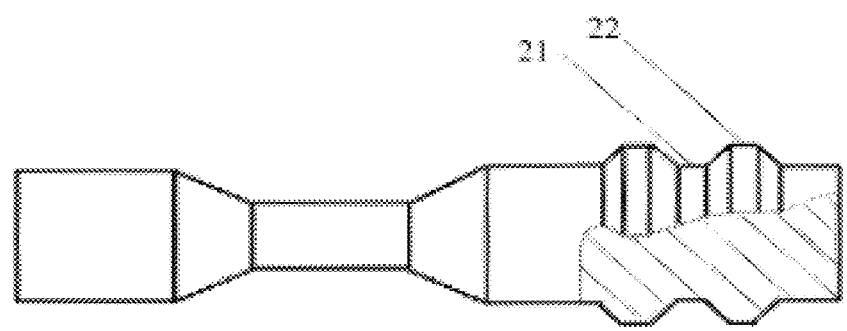
FIG. 4 is a Patterned Barbell Horn (or Patterned Transducer Barbell Horn Assembly) according to another embodiment of the present invention.

In the present invention, a Barbell Horn design is introduced incorporating additional radiating elements, which are machined as integral parts of the horn, as shown in FIG. 4. The output cylindrical section of the device is given a series of specially positioned grooves 21, and protrusions 22, which may be horizontal (orthogonal to the main horn axis) or be arranged as intersecting right-hand and left-hand screw threads positioned at an angle to the main horn axis. This system of grooves and protrusions permits significantly increasing total radiated acoustic energy from the side surface of the device and enhances the ultrasonic effect on the liquid load as it moves inside the reactor chamber. The first transitional section of this horn may have any of the shapes described in U.S. Pat. No. 7,156,201 or a short catenoidal shape as described in the present invention. Additionally, piezoelectric annular transducers may be incorporated close to the nodal locations of this horn converting it into a Patterned Transducer-Barbell Horn Assembly.

Embodiment 5—Extended Barbell Horn (Extended Transducer-Barbell Horn Assembly)

Figure 5:
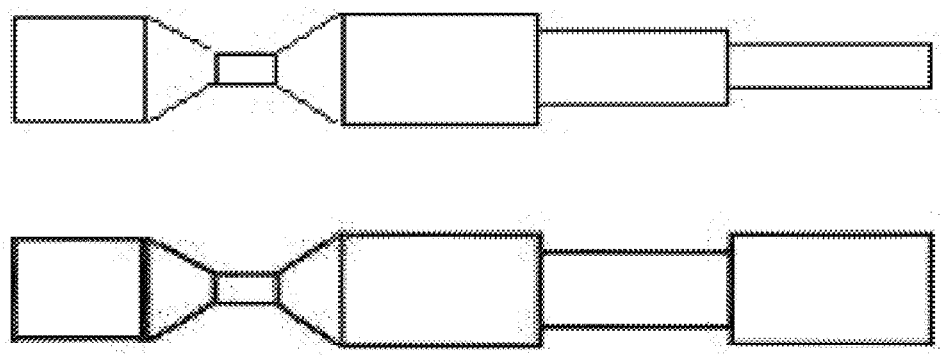
FIG. 5 is two versions of an Extended Barbell Horn (or Extended Transducer Barbell Horn Assembly) according to another embodiment of the present invention.

To increase the total radiating surface of a Barbell Horn and, therefore, to achieve an increase in the total radiated energy, additional radiating cylindrical sections of different diameters may be incorporated, preferably machined as integral parts of the horn as seen in FIG. 5. This horn has additional radiating surfaces orthogonal to its main axis, formed due to the differences in the diameters of the cylindrical sections, which are mainly responsible for the increased radiation of acoustic energy. The first transitional section of this horn may have any of the shapes described in U.S. Pat. No. 7,156,201 or a short catenoidal shape as described in the present invention. Additionally, piezoelectric annular transducers may be incorporated close to the nodal locations of the horn converting it into an Extended Transducer-Barbell Horn Assembly.

Embodiment 6—Hollow Barbell Horn (Hollow Transducer-Barbell Horn Assembly)

Figure 6:
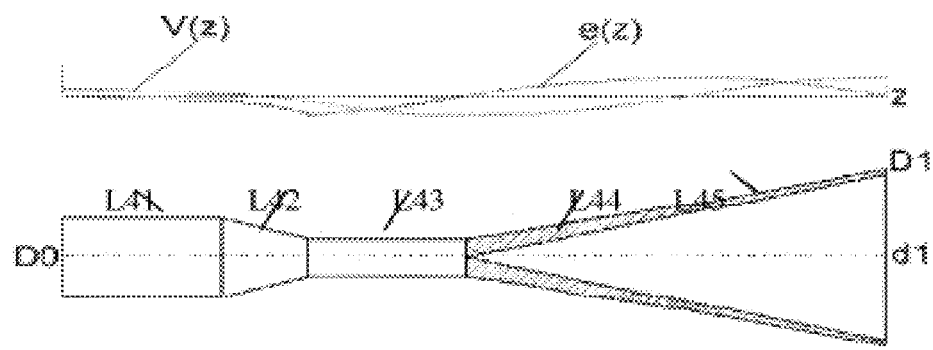
FIG. 6 is a Hollow Barbell Horn (or Hollow Transducer Barbell Horn Assembly) according to another embodiment of the present invention.

From the theory of acoustics, it follows that the cross-sectional diameter of any ultrasonic horn is required to be smaller than approximately $\lambda/4$, where $\lambda$ is the ultrasound wavelength in the horn material. This, however, relates only to the "live" cross-section, or that actually filled with horn material. If a part of the cross-section is formed by a hollow region, that part should not be included in this restriction. This important condition permits calculating a Barbell Horn with a short hollow region in its last output section or a long hollow region in its last output section and the section adjacent to it, as shown in FIG. 6, where V(z)—distribution of the amplitude of vibration velocity along the horn length, e(z)—distribution of the deformation along the horn length, with L41-L45 indicating the lengths of the corresponding horn elements, respectively. It is important to point out that in this case the total diameter of the output section of the horn may be much greater than λ/4 even at a high gain factor. The main radiating surface of the horn during its operation in a liquid load, therefore, becomes the cumulative side surface of its hollow region, including both the outside and the inside surfaces, since both are positioned at a significant angle to the main horn axis and, therefore, have large longitudinal vibration components. The cumulative radiating surface of this horn and, therefore, its total radiated acoustic energy may be much greater than those of a common Barbell Horn. The longevity and reliability of this horn is also very high because it is machined as one integral unit. The first transitional section of this horn may have any of the shapes described in U.S. Pat. No. 7,156,201 or a short catenoidal shape as described in the present invention. Additionally, piezoelectric annular transducers may be incorporated close to the nodal locations of the horn converting it into a Hollow Transducer-Barbell Horn Assembly.

Figure 7:
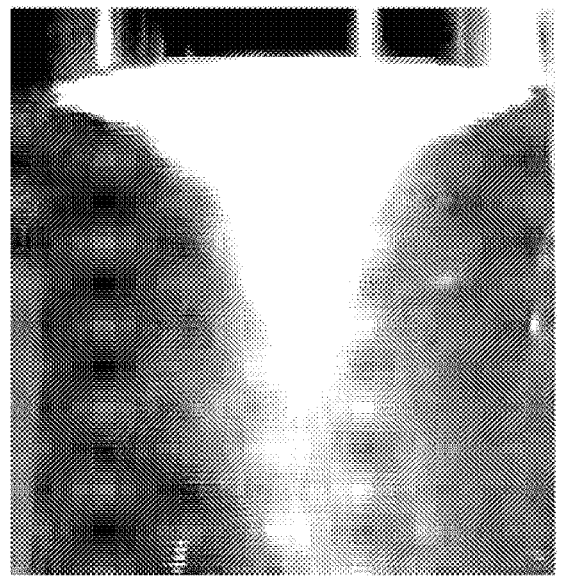
FIG. 7 is a photograph of a well-developed stable cavitation field created in water under the output radiating surface of a Barbell Device.

FIG. 7 is an experimentally obtained photograph of a well developed stable cavitation field created in an unrestricted volume of water under the output radiating surface of a Barbell Device, having the following operational parameters: output surface diameter—65 mm, ultrasound frequency—18 kHz, specific acoustic power—20 W/cm$^2$.

Figure 8:
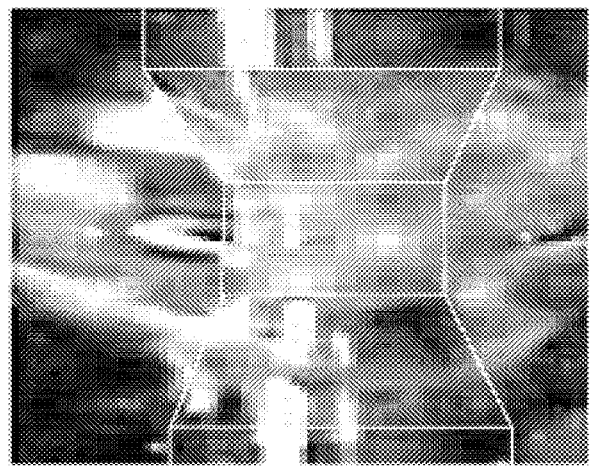
FIG. 8 is a photograph of a stable cavitation field created in water near the lateral surface of a Barbell Device.

FIG. 8 is an experimentally obtained photograph of a stable cavitation field created in an unrestricted volume of water near the lateral surface of a Barbell Device (marked with a white line), having the following operational parameters: output surface diameter—65 mm, ultrasound frequency—18 kHz, specific acoustic power—20 W/cm$^2$.

Figure 9:
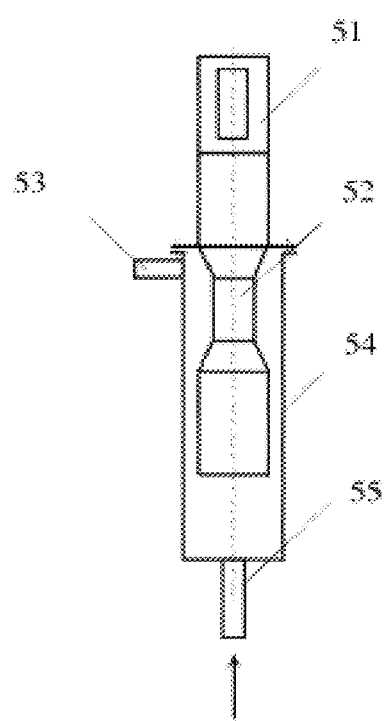
FIG. 9 is a flow-through ultrasonic reactor based on a Barbell Device, such as the Barbell Horn, Catenoidal Barbell Horn, Patterned Barbell Horn or the any of the corresponding Transducer Barbell Horn Assemblies, according to another embodiment of the present invention.

Embodiment 7—Ultrasonic Reactor Based on a Barbell Device, Such as the Barbell Horn, Catenoidal Barbell Horn, Patterned Barbell Horn or the any of the Corresponding Transducer Barbell Horn Assemblies Referring to FIG. 9, there is seen a flow-through ultrasonic reactor based on a Barbell Device, such as the Barbell Horn, Catenoidal Barbell Horn, Patterned Barbell Horn or the any of the corresponding Transducer Barbell Horn Assemblies, according to the seventh embodiment of the present invention. The reactor comprises an electro-acoustical transducer 51, a Barbell Device 52, a valve 53, a reactor chamber 54, and a valve 55.

Figure 10:
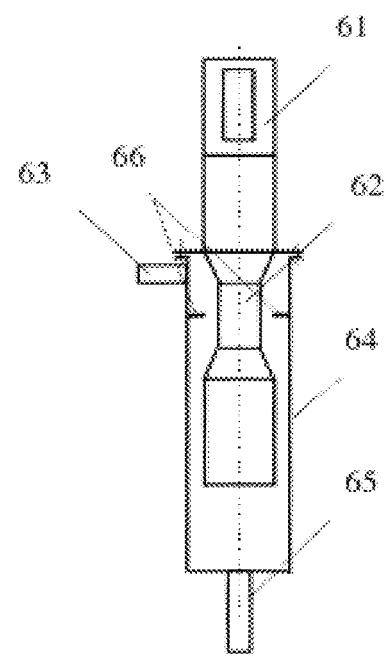
FIG. 10 is a flow-through ultrasonic reactor based on a Barbell Device, such as the Barbell Horn, Catenoidal Barbell Horn, Patterned Barbell Horn or the any of the corresponding Transducer Barbell Horn Assemblies, according to another embodiment of the present invention.

Embodiment 8—Ultrasonic Reactor Based on a Barbell Device, Such as the Barbell Horn, Catenoidal Barbell Horn, Patterned Barbell Horn or the any of the Corresponding Transducer Barbell Horn Assemblies FIG. 10 is a flow-through ultrasonic reactor based on a Barbell Device, such as the Barbell Horn, Catenoidal Barbell Horn, Patterned Barbell Horn or the any of the corresponding Transducer Barbell Horn Assemblies, according to the eighth embodiment of the present invention. The reactor is equipped with a circular reflection surface and comprises an electro-acoustical transducer 61, a Barbell Device 62, a valve 63, a reactor chamber 64, a valve 65, and a circular reflection surface 66.

Figure 11:
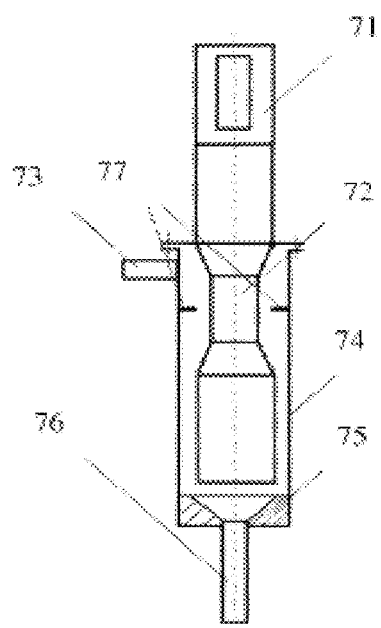
FIG. 11 is a flow-through ultrasonic reactor based on a Barbell Device, such as the Barbell Horn, Catenoidal Barbell Horn, Patterned Barbell Horn or the any of the corresponding Transducer Barbell Horn Assemblies, according to another embodiment of the present invention.

Embodiment 9—Ultrasonic Reactor Based on a Barbell Device, Such as the Barbell Horn, Catenoidal Barbell Horn, Patterned Barbell Horn or the any of the Corresponding Transducer Barbell Horn Assemblies FIG. 11 is a flow-through ultrasonic reactor based on a Barbell Device, such as the Barbell Horn, Catenoidal Barbell Horn, Patterned Barbell Horn or the any of the corresponding Transducer Barbell Horn Assemblies, according to the ninth embodiment of the present invention. The reactor is equipped with a circular reflection surface and an insert at the bottom, shaped as an upside-down circular cone, and comprises an electro-acoustical transducer 71, a Barbell Horn 72, a valve 73, a reactor chamber 74, an upside-down circular cone insert 75, a valve 76, and a circular reflection surface 77.

Experimental Results Illustrating the Embodiments 7-9

It is well known that during acoustic cavitation the acoustic energy is practically completely absorbed by the liquid load in the active cavitation zone and that the acoustic cavitation itself is the mechanism that converts the absorbed acoustic energy into heat. Therefore, the effectiveness and the degree of the technological activity of a given ultrasonic apparatus can be judged by the amount of heat deposited in the cavitation zone during its operation. In other words, maximization and optimization of the active zone volume and the intensity of cavitation in a given ultrasonic reactor leads to maximization and optimization of the technological effects obtained during operation of the reactor.

A series of experiments are presented below, in which the above-mentioned considerations are used to evaluate the seventh through ninth embodiments of the present invention. The liquid load utilized in these experiments was tap water settled during a 24 hour period. The amount of heat produced due to the acoustic energy absorbed by the liquid load was measured by a direct calorimetry method, as described in the following references: S. L. Peshkovsky, A. S. Peshkovsky, Ultrason. Sonochem. 14 (2007) 314 and S. L. Peshkovsky, A. S. Peshkovsky, Ultrason. Sonochem. 15 (2008) 618.

According to the equations provided in U.S. Pat. No. 7,156,201 and in the publication, S. L. Peshkovsky, A. S. Peshkovsky, Ultrason. Sonochem. 14 (2007) 314, a titanium alloy Barbell Horn was calculated and constructed having the following main parameters: output tip diameter—65 mm, output tip surface—33.2 cm$^2$, output vibration amplitude—70 microns peak-to-peak, frequency of ultrasonic vibration—20 kHz, output tip oscillation velocity—314 cm/sec (rms). Three reactor chamber types were also constructed for the experiments, corresponding to the seventh through ninth embodiments of the present invention (FIGS. 9-11). All three reactor chambers were equipped with thermo-isolated walls with incorporated heat sensors. The distance between the output tip of the Barbell Horn and the bottom of the reactor chamber (or the top of the cone insert used in the ninth embodiment shown in FIG. 11) was 70 mm. Vibration amplitude was maintained constant during the experiments.

Experiment 1: Liquid load (settled tap water) was placed in the reactor chamber according to the seventh embodiment of the present invention, such that the surface of the water was approximately 20 mm above the output tip of the Barbell Horn. The measured acoustical power deposited into the water during operation of the reactor was 996 W. In this case the cavitation zone was formed almost entirely at the output tip of the horn, as shown in FIG. 7.

Experiment 2: Liquid load (settled tap water) was placed in the reactor chamber according to the eighth embodiment of the present invention, such that the surface of the water reached the outlet valve. The reactor chamber was, therefore, filled with the liquid completely. The measured acoustical power deposited into the water during operation of the reactor was 1295 W. The increase in the absorbed acoustic energy compared to Experiment 1 was due to the presence of an additional upper cavitation zone in the narrow part of the Barbell Horn, as shown in FIG. 8.

Experiment 3: Liquid load (settled tap water) was placed in the reactor chamber according to the ninth embodiment of the present invention, such that the surface of the water reached the outlet valve. The reactor chamber was, therefore, filled with the liquid completely. The measured acoustical power deposited into the water during operation of the reactor was 1554 W. The increase in the absorbed acoustic energy compared to Experiment 2 was due to the presence of a cone insert at the bottom of the reactor chamber, which optimized the volume and the shape of the main cavitation zone at the output tip the Barbell Horn.

Figure 12:
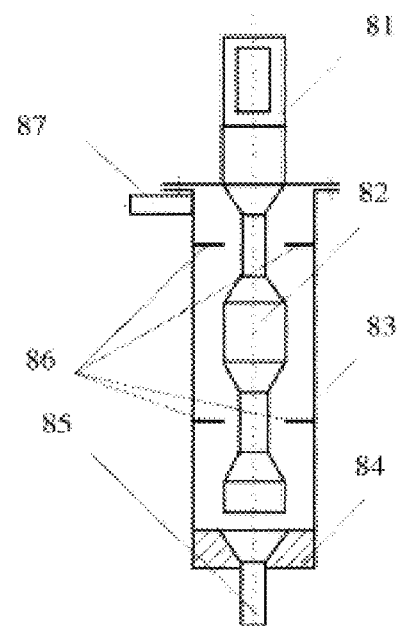
FIG. 12 is a flow-through ultrasonic reactor based on a Long Barbell Horn, a Catenoidal Long Barbell Horn or a corresponding Long Transducer Barbell Horn Assembly, according to another embodiment of the present invention.

Embodiment 10—Ultrasonic Reactor Based on a Long Barbell Device, Such as the Long Barbell Horn, Catenoidal Long Barbell Horn or a Corresponding Long Barbell Horn Assembly FIG. 12 is a flow-through ultrasonic reactor based on a Long Barbell Device, such as the Long Barbell Horn, Catenoidal Long Barbell Horn or a corresponding Long Barbell Horn Assembly, according to the tenth embodiment of the present invention. The reactor is equipped with two circular reflection surfaces and an insert at the bottom, shaped as an upside-down circular cone. The reactor comprises an electro-acoustical transducer 81, a Long Barbell Device 82, a reactor chamber 83, an upside-down circular cone insert 84, a valve 85, circular reflection surfaces 86, and a valve 87.

Embodiments 11 and 12—Two Versions of Ultrasonic Reactors Based on Extended Barbell Horns or the Extended Transducer Barbell Horn Assemblies FIGS. 13 and 14 are two versions of flow-through ultrasonic reactors based on Extended Barbell Horns or the Extended Transducer Barbell Horn Assemblies, according to the eleventh and twelfth embodiments of the present invention. The reactors are equipped with circular reflection surfaces and inserts at the bottom, shaped as upside-down circular cones. The reactor of FIG. 13 comprises an electro-acoustical transducer 91, an Extended Barbell Horn or Extended Transducer Barbell Horn Assembly 92, a reactor chamber 93, an upside-down circular cone insert 94, a valve 95, a first circular reflection surface 96, a second circular reflection surface 97, and a valve 98. The reactor of FIG. 14 comprises an electro-acoustical transducer 101, an Extended Barbell Horn or Extended Transducer Barbell Horn Assembly 102, a reactor chamber 103, an upside-down circular cone insert 104, a valve 105, a circular reflection surface 107, and a valve 108.

Figure 15:
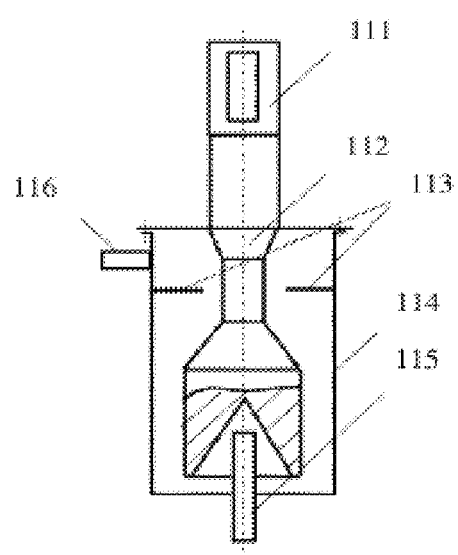
FIG. 15 is a flow-through ultrasonic reactor based on a Hollow Barbell Horn (or Hollow Transducer Barbell Horn Assembly) with a short internal hollow region according to another embodiment of the present invention.

Embodiments 13, 14 and 15—Ultrasonic Reactors Based on Hollow Barbell Horns or Hollow Transducer Barbell Horn Assemblies FIG. 15 is a flow-through ultrasonic reactor based on a Hollow Barbell Horn or a Hollow Transducer Barbell Horn Assembly with a short internal hollow region, according to the thirteenth embodiment of the present invention. The length of the hollow region is smaller or equal to the length of the cylindrical output element of the device. The reactor comprises an electro-acoustical transducer 111, a Hollow Barbell Horn or Hollow Transducer Barbell Horn Assembly 112, a circular reflection surface 113, a reactor chamber 114, a valve 115, and a valve 116. The liquid load is supplied near the top of the hollow region into the cavitation field formed inside the hollow region.

Experimental Results Illustrating the Embodiment 13

A titanium alloy Hollow Barbell Horn with a short internal hollow region was calculated and constructed according to the equations given in U.S. Pat. No. 7,156,201 and in the publication S. L. Peshkovsky, A. S. Peshkovsky, Ultrason. Sonochem. 14 (2007) 314. The internal hollow region of the horn was a straight circular cone with a sharp tip. The constructed horn had the following parameters: Outside output diameter—60 mm, inside output diameter-50 mm, depth of the internal hollow region—60 mm, output vibration amplitude—70 microns peak-to-peak, ultrasonic frequency—20 kHz, output oscillation velocity—314 cm/sec (rms). The total surface area of the internal hollow region was 51 $cm^2$.

Liquid load (settled tap water) was placed in the reactor chamber, according to the thirteenth embodiment of the present invention, such that the surface of the water reached the outlet valve. The reactor chamber was, therefore, filled with the liquid completely. The reactor chamber was equipped with thermo-isolated walls with an incorporated heat sensor. The measured acoustical power deposited into the water during operation of the reactor was 1709 W. This example shows that the use of the Hollow Barbell Horn in an appropriate ultrasonic reactor chamber permits achieving an additional increase in the acoustic energy deposited in the active cavitation zone in the reactor chamber, thereby increasing technological effectiveness of the reactor.

Figure 16:
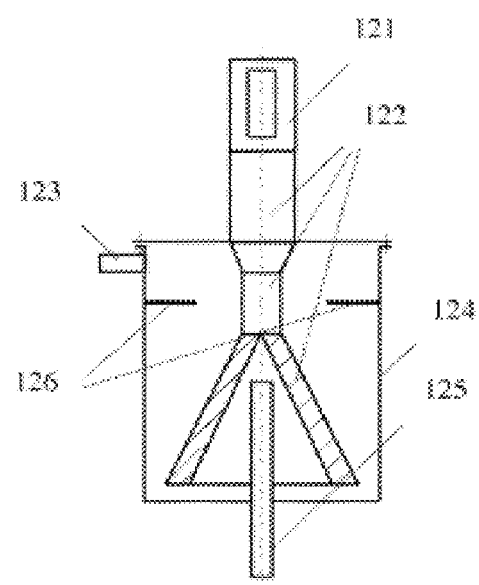
FIG. 16 is a flow-through ultrasonic reactor based on a Hollow Barbell Horn (or Hollow Transducer Barbell Horn Assembly) with a long internal hollow region according to another embodiment of the present invention.

FIG. 16 is a flow-through ultrasonic reactor based on a Hollow Barbell Horn with a long internal hollow region, according to the fourteenth embodiment of the present invention. The length of the hollow region is smaller or equal to the combined lengths of the cylindrical output element of the horn and its adjacent element with variable cross-section. The reactor comprises a electro-acoustical transducer 121, a Hollow Barbell Horn or Hollow Transducer Barbell Horn Assembly 122, a valve 123, a reactor chamber 124, a valve 125, and a circular reflection surface 126. The liquid is supplied near the top of the hollow region into the cavitation field formed inside the hollow region.

Figure 17:
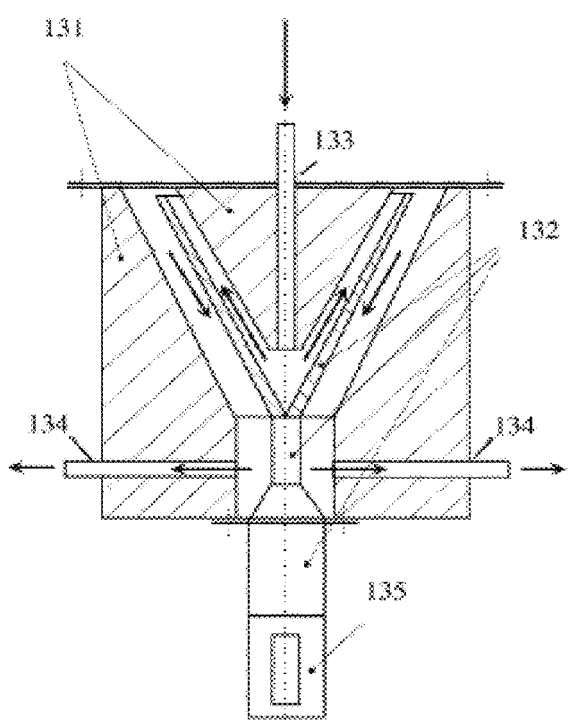
FIG. 17 is another version of a flow-through ultrasonic reactor based on a Hollow Barbell Horn (or Hollow Transducer Barbell Horn Assembly) with a long internal hollow region according to another embodiment of the present invention.

FIG. 17 is another version of a flow-through ultrasonic reactor based on a Hollow Barbell Horn or a Hollow Transducer Barbell Horn Assembly with a long internal hollow region, according to the fifteenth embodiment of the present invention. The reactor chamber is modified such that all liquid is directed into the highest intensity cavitation zone. An upside-down positioning of the reactor is preferably utilized. The reactor comprises a reactor chamber 131, a Hollow Barbell Horn or Hollow Transducer Barbell Horn Assembly 132, a valve 133, a valve 134, and an electro-acoustical transducer 135. The liquid is supplied near the top of the hollow region into the cavitation field formed inside the hollow region.

Figure 18:
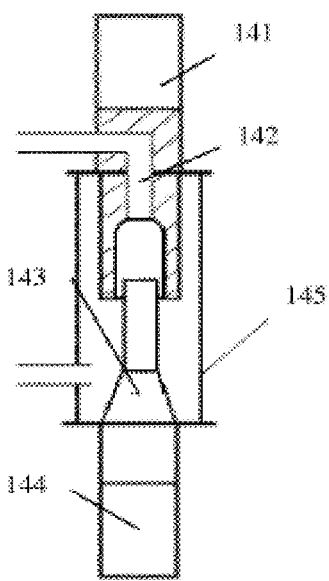
FIG. 18 is a flow-through ultrasonic reactor based on a Hollow Barbell Horn (or Hollow Transducer Barbell Horn Assembly) with a short or a long internal hollow region and a generic horn operating in-phase according to another embodiment of the present invention.

Embodiment 16—Ultrasonic Reactor Based on a Hollow Barbell Horn or a Hollow Transducer Barbell Horn Assembly and a Generic Ultrasonic Horn of an Arbitrary Design FIG. 18 is a flow-through ultrasonic reactor based on a Hollow Barbell Horn (or Hollow Transducer Barbell Horn Assembly) and a generic horn of arbitrary design, according to the sixteenth embodiment of the present invention, where the reactor comprises electro-acoustical transducer 141 and 144, a Hollow Barbell Horn or Hollow Transducer Barbell Horn Assembly 142, a generic ultrasonic horn 143, and a reactor chamber 145. The horns are arranged such that the generic horn fits inside the Hollow Barbell Horn (or Hollow Transducer Barbell Horn Assembly). The horns are operated in-phase, thereby increasing the cavitation field intensity.

Embodiment 17—Ultrasonic Extruder for Polymer Melts Processing

It is generally thought that acoustic cavitation can only occur in low viscosity liquids. Consequentially, the prior art studies of the cavitation effects on high-molecular compounds (such as polymers) are restricted to those conducted in low-viscosity solutions of such compounds. Many of such studies show that ultrasonic cavitation causes significant physical and chemical transformations in such polymers, which can be very useful for their processing. These studies, however, are mostly of academic interest because processing of weak polymer solutions is very technologically inefficient. Industrial impact of such studies, therefore, was severely limited.

Figure 22:
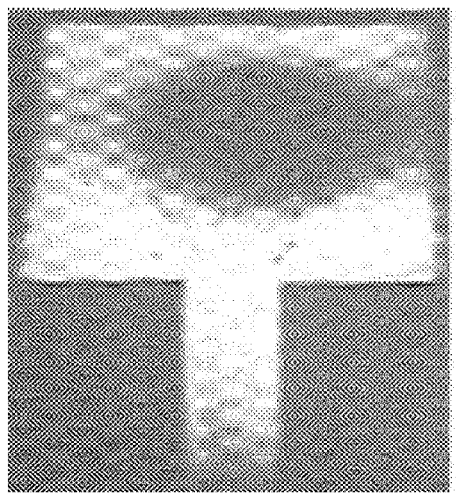
FIG. 22 is a photograph of a cavitation field formed in static high-viscosity polymer melt formed under the output radiating surface of a Barbell Device.
Figure 23:
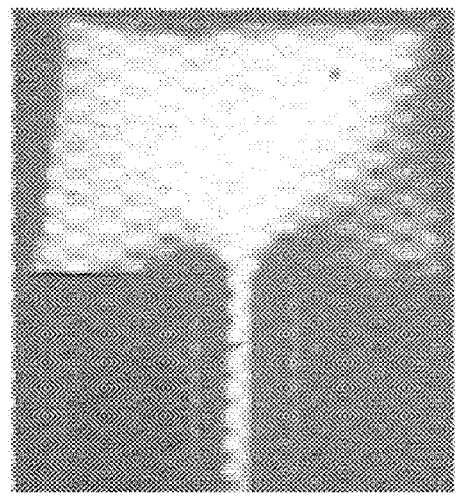
FIG. 23 is a photograph of a cavitation field formed in high-viscosity polymer melt flowing through a transparent shaping channel, formed under the output radiating surface of a Barbell Device.

One publication (M. L. Friedman and S. L. Peshkovsky, Molding of Polymers under Conditions of Vibration Effects, Advances in Polymer Science, Polymer Processing, NY, 1990, p 41-79), incorporated herein by reference, however, shows experimental evidence that visco-elastic fluids, such as polymer melts with viscosity on the order of $10^6$ Pa*s, can also undergo cavitation, as a result of which clouds of active cavitation regions are created. This phenomenon is related to the presence of not only the high viscosity, but also the elasticity in these compounds. FIG. 22 and FIG. 23 show photographs of such cavitation cloud regions in the stationary and the flowing melt of polyisobutylene, respectively. Based of these observations, in the present invention it has been determined that an appropriately designed polymer extruder with and suitable ultrasonic reactor equipped with a Barbell Horn can be very useful for the polymer processing industry.

FIG. 19 is a schematic of an Ultrasonic Extruder for the treatment of high-viscosity polymer melts with high-intensity ultrasound, according to the seventeenth embodiment of the present invention. The Ultrasonic Extruder comprises a polymer extruder 151, a reactor chamber 152, a Barbell Device 153, and an electro-acoustical transducer 154.

FIG. 20 is an expanded view of a flow-through ultrasonic reactor head for an ultrasonic extruder 160, comprising an electro-acoustical transducer 161, a Barbell Device 162, a heating element 163, a reactor chamber 164, a shaping head 165, and a polymer extruder body 166. Polymer melt from extruder 160 is directed under pressure into the ultrasonic reactor head equipped with a temperature control unit. In the ultrasonic reactor head, the polymer melt flows into the spacing between the shaping head and the Barbell Device, where it becomes exposed to ultrasonic vibrations excited by an electro-acoustical transducer. During high-intensity ultrasonic treatment, the physical/chemical properties of the polymers change, along with their molecular structures. Various chemical reactions, copolymerization, devulcanization, side chain aggregation and other modifications may take place.

FIG. 21 is a schematic of a device for treatment of high-viscosity polymer melts with high-intensity ultrasound, based on the principle of cascade extrusion. The reactor comprises a first polymer extruder 171, an electro-acoustical transducer 172, a Barbell Device 173, a reactor chamber 174, a second polymer extruder 175, and a shaping head 176.

Embodiment 18—Ultrasonic Reactor Based on a Nonmetallic Barbell Device

In the eighteenth embodiment of the present invention, the ultrasonic flow-through reactor is designed to be suitable for the processing of chemically aggressive liquids, extremely high-purity compounds, as well as for operation in electromagnetic, magnetic, electric, microwave, etc, fields in which the use of metallic objects is undesirable or impossible. Ultrasonic radiation in such a reactor is performed using a Barbell Device (possibly with an additional acoustically rigidly connected waveguide-radiator) made from a nonmetallic material, such as technical corundum material, $Al_2O_3$, (for example, sapphire, leucosapphire, ruby, etc.).

What is claimed is:

1. An ultrasonic waveguide-radiator having a total length formed from a predetermined material, comprising:
a first cylindrical section having a first diameter and a first length, and including an entrance surface having an entrance cross-sectional area;
a first transitional section acoustically coupled to the first cylindrical section having a first variable cross-section and a first transitional length;
a second cylindrical section acoustically coupled to the first transitional section and having a second diameter and a second length;
a second transitional section acoustically coupled to the second cylindrical section and having a second variable cross-section and a second transitional length;
a third section acoustically coupled to the second transitional section and having a third length, and including an exit surface having an exit cross-sectional area;
wherein the total length is equal to a multiple of one-half of the acoustic wavelength in the predetermined material accounting for phase velocity dispersion;
wherein the length of said first transitional section is less than the value of ln(N)/k where N is the ratio of the first and second diameters of the first and second cylindrical sections, respectively, and k is the wave number representing the angular frequency of ultrasonic vibrations divided by the speed of sound in the predetermined material.

2. The waveguide-radiator of claim 1, wherein at least one of the first cylindrical, second cylindrical, or third sections further comprises an even number of annular piezoelectric transducer elements for converting electric energy into acoustic energy.

3. The waveguide-radiator of claim 2, wherein said waveguide-radiator comprises a non-metal material.

4. The waveguide-radiator of claim 2, further comprising a non-metal rod acoustically coupled to the exit surface of the third section.

5. The waveguide-radiator of claim 1, wherein said first variable cross-section is catenoidal.

6. The waveguide-radiator of claim 1, wherein said waveguide-radiator comprises a non-metal material.

7. The waveguide-radiator of claim 1, further comprising a non-metal rod acoustically coupled to the exit surface of the third section.

8. The waveguide-radiator of claim 1, wherein said third section includes a hollow portion that extends from a first internal diameter to a second internal diameter.

9. The waveguide-radiator of claim 8, at least one of the first cylindrical, second cylindrical, or third sections further comprises an even number of annular piezoelectric transducer elements for converting electric energy into acoustic energy.

10. The waveguide-radiator of claim 8, wherein said second transitional section includes a hollow portion that extends from a first internal diameter to a second internal diameter.

11. The waveguide-radiator of claim 10, wherein at least one of the first cylindrical, second cylindrical, or third sections further comprises an even number of annular piezoelectric transducer elements for converting electric energy into acoustic energy.

12. An ultrasonic reactor comprising an ultrasonic waveguide-radiator according to claim 1 positioned in a chamber having an inlet and an outlet and including a working fluid having an acoustic wavelength.

13. The reactor of claim 12, wherein said waveguide-radiator is positioned inside said chamber such that the distance between the exit surface of said wave-guide radiator and the bottom of the chamber is about the acoustic wavelength in the working fluid and the volume of the working fluid contained inside said chamber in the area below said exit surface is about the cube of the acoustic wavelength in the working fluid.

14. The reactor of claim 12, wherein said chamber further comprises at least one reflector surface positioned in the chamber adjacent to said second cylindrical section.

15. The reactor of claim 12, wherein said chamber further comprises:
- a hollow conical zone positioned in said chamber adjacent to said exit surface;
- wherein the height of the conical zone and the internal diameter of the base of the conical zone are about the acoustic wavelength in the working fluid, the volume of the conical zone is about the cube of the acoustic wavelength in the working fluid, and said inlet is positioned at the top of the conical zone.

16. The reactor of claim 12, wherein said third section of said wave-guide radiator is at least partially hollow and the reactor further comprises a second waveguide radiator positioned in said chamber and extending into the hollow section of the first radiator.

\* \* \* \* \*